United States Patent [19]

Prince, Jr. et al.

[11] 4,233,553
[45] Nov. 11, 1980

[54] AUTOMATIC DUAL MODE BATTERY CHARGER

[75] Inventors: Luther T. Prince, Jr., Minneapolis; Wilbur J. Hampel, Spring Park; Michael A. Boot, Minneapolis, all of Minn.

[73] Assignee: Ault, Inc., Minneapolis, Minn.

[21] Appl. No.: 904,517

[22] Filed: May 10, 1978

[51] Int. Cl.³ .............................................. H02J 7/04
[52] U.S. Cl. ...................................... 320/23; 320/32; 320/39
[58] Field of Search ....................................... 320/21–24, 320/39, 35, 32

[56] References Cited

U.S. PATENT DOCUMENTS

| | | |
|---|---|---|
| 3,517,295 | 6/1970 | Lapuyade . |
| 3,699,422 | 10/1972 | Miller et al. ........................ 320/39 X |
| 3,735,233 | 5/1973 | Ringle . |
| 3,852,652 | 12/1974 | Jasinski ................................. 320/35 |

Primary Examiner—Robert J. Hickey
Attorney, Agent, or Firm—Schroeder, Siegfried, Ryan, Vidas, Steffey, & Arrett

[57] ABSTRACT

This invention relates to automatic dual mode battery charging circuit which includes rectifying means and an adjustable voltage rectifier energized by the rectifying means and providing an output to a battery to be charged. The circuit includes a voltage controller connected to the voltage regulator means to set the level of voltage output from the voltage regulator and hence the charging current to the battery. The voltage regulating means provides two modes of operation, namely, a fast charge and a float mode of operation. A current detector connecting in series circuit with the voltage regulator and the battery provides a means for detecting current flow through the battery and controls the operation of the voltage controller, to change the output of the voltage regulating means between the two modes of operation.

9 Claims, 1 Drawing Figure

U.S. Patent
Nov. 11, 1980
4,233,553
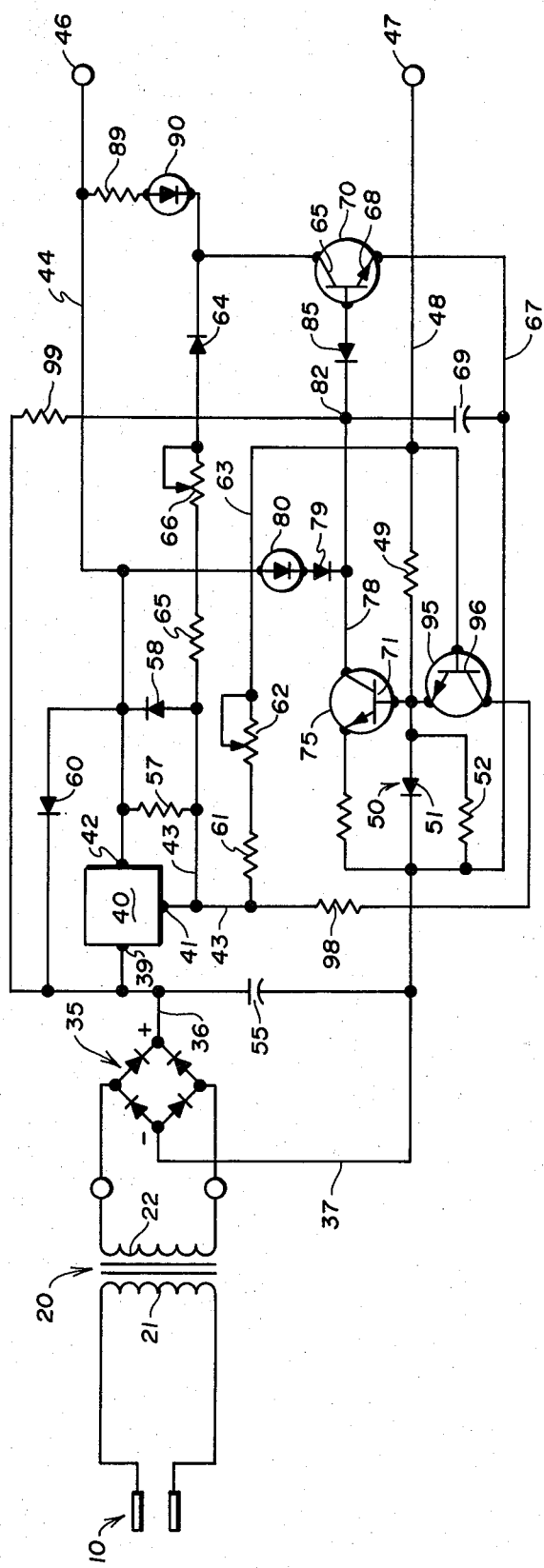

AUTOMATIC DUAL MODE BATTERY CHARGER

FIELD AND BACKGROUND OF INVENTION

This invention relates to battery chargers and more particularly to an improved automatic dual mode battery charger.

The increasing use of batteries in electrical and electronic devices and the improvements in present day battery capabilities and design have increased the need for simplified battery charging equipment to maintain batteries used in such equipment in a charged condition. The automatic battery charger must provide a relative rapid recovery but must neither overcharge nor undercharge the battery.

In recent years there has been a development of sophisticated battery charging equipment which is capable of charging batteries at a plurality of different charging rates. Such equipment operates with different levels of charging voltage and some types incorporate sophisticated power generating and current control equipment with elaborate voltage references and various means of current detection. In addition to the plural levels of charging, some of the circuitries have employed various timing means and relatively complicated switching circuits for disconnecting and reconnecting the battery charger to the battery. In general, these prior battery chargers have employed complex circuitry and circuit components increasing the cost of the charging equipment and the maintenance of the same

SUMMARY OF INVENTION

The battery charger of the present invention is an automatic dual mode battery charger which utilizes a conventional adjustable voltage regulator, the output of which is controlled by a voltage controller with a current level detector sensing battery current to adjust the voltage controller between the two modes of operation. The adjustable voltage regulator delivers current to a battery at a fast charge voltage level or a level higher than the normal battery voltage as established by the adjustable voltage controller. The charging current to the battery will continue to flow, but will reduce as the battery reaches a fully charged state. When the battery becomes fully charged, the charging current reduces to a known value, depending upon battery capacity, and this will be sensed by a current level detector to switch a simplified circuit in the voltage controller. This will adjust the voltage controller and change the output of the voltage regulator to a lower float voltage establishing a low charging current. The trickle charge or low charging current will remain on indefinitely until the battery is discharged or upon demand of current from the same. Whenever current drawn from the battery increases, the current detector senses the increased battery charging current and operates the voltage controller to reestablished the higher voltage charging rate. The improved and simplified circuit includes light indicating diodes which indicate the particular mode of operation in which the voltage regulator is in and, hence, the mode of operation of the battery charger.

DESCRIPTION OF DRAWING

The drawing discloses a schematic electric circuit of the improved battery charger.

DESCRIPTION OF PREFERRED EMBODIMENT

The drawing shows a schematic circuit diagram of our improved battery charger. It is adapted to be energized from a conventional 110 volt, 60 cycle, AC source which is connected through a suitable bayonet type connector 10 to a step-down transformer, indicated generally at 20. The transformer is comprised of a primary winding 21 to which the terminal plug 10 is connected with a secondary winding 22 being connected to a full wave rectifier 35. The rectifier 35 provides a DC voltage and current output therefrom with a conductor 36 having a plus voltage thereon and the conductor 37 being connected to the minus or return side of the rectifier. The plus conductor 36 is connected to the input 39 of a conventional voltage regulator 40 shown in the drawing in block form, which is preferably of the type designated LM317MP. The output of the regulator is indicated by the conductor 42 which is connected through a conductor 44 to the plus terminal 46 of the battery charger. A minus terminal 47 of the battery charger is connected through a conductor 48 and resistor 49 leading to a current detector, indicated generally at 50. The current detector is formed of a diode 51 and a resistor 52 connected in parallel and is connected to the return conductor 37. A suitable filtering capacitor 55 is connected in parallel across the conductors 36, 37. The voltage regulator 40 has a voltage adjusting terminal 41 which is connected to a conductor 43. A resistor 57 and diode 58 are connected in parallel between output conductor 42 and conductor 43 for stabilization of the voltage regulator. Similarly, a diode 60 is connected between the output conductor 42 and the input conductor 36 or terminal 39 of the voltage regulator for circuit stabilization purposes.

The output of the voltage regulator 40 is adjusted by a voltage applied to terminal 41. This voltage is determined by a pair of variable resistance circuits forming a voltage controller. The first circuit is formed by a fixed resistor 61 and a variable resistor 62 connected in series and to the voltage adjustment terminal 41 of the voltage regulator 40 with the circuit being completed through a conductor 63 to the conductor 48 common to the negative terminal of the battery charger. The voltage bias on the voltage adjustment terminal is established from an output voltage terminal 42 through the resistor 57 to the conductor 43 and resistors 61, 62. Resistor 62 is adjustable to determine the maximum charging voltage of the voltage regulator.

A second resistor circuit for the voltage controller is formed from terminal 41 by a fixed resistor 65 connected in series with an adjustable resistor 66 and a diode 64 leading to a collector electrode 65 of a transistor 70 whose emitter 68 is connected through a conductor 67 to the negative side of the full wave rectifier 35 through the conductor 37. The voltage controller formed by the parallel variable resistance legs establish the output of the voltage regulator 40 and hence, the level of charging current of the battery which is adapted to be connected to the terminals 46, 47 of the charger.

The first resistance leg formed by fixed resistor 61 and variable resistor 62 establishes the high level or charging voltage for the regulator by adjusting the voltage at the control point connected to adjustment terminal 41. The second or parallel resistance leg formed by resistors 65, 66 is selectively connected in current parallel with the first named leg through the operation of the transistor 70 and, when connected in parallel, will adjust the level at the voltage adjusting terminal 41 to a lower or float voltage output of the regulator. This establishes a float current or trickle charge to the battery, whenever the same is at a charged level. The current detector 50, formed by a diode 51 and resistor 52 in parallel circuit, adjusts the bias on the base 71 of a transistor 75 whose emitter is connected through a resistor to conductor 37 and whose collector is connected to a conductor 78. A diode 79 and light emitting diode or indicating light 80 are series connected between output conductor 42 of the voltage regulator and conductor 78. Transistor 75 will normally be conducting whenever a high charging current is directed through a battery connected to the terminals 46, 47 with a high charging voltage output from the voltage regulator. Thus, the fast charge voltage level may be set by the adjustable resistor 62. The current detecting circuit establishes a voltage drop across resistor 52 which maintains a bias level on the base 71 of transistor 75 to maintain it in a conducting condition. When the battery becomes fully charged, the current output through the battery terminals 46, 47 reduces to a known value, depending upon battery capacity and the drop in voltage across resistor 52 of the current detector will lower the bias on the base 71 of transistor 75 allowing the same to go to a non-conducting state of operation. While the transistor 75 is conducting, the light emitting diode 80 will be energized and provide a visual indication of the fast charge mode of operation for the battery charger.

The transistor 70 is normally biased off and receives its bias from a resistor 99 connected from the input conductor 36 of the voltage regulator to a voltage references point 82 common to conductor 78 and through a zener diode 85 to the base of the transistor 70. Whenever the transistor 75 is conducting, the voltage drop through the resistor 99 is such as to maintain the voltage reference point 82 common to the zener diode 85 at a level where the diode does not break down. Thus, transistor 70 will be turned off. Whenever transistor 75 goes to a non-conducting state of operation due to a low current flow through the current detecting circuit, the voltage at the zener diode 85 reaches a level of breakdown applying a bias to the base of transistor 70 and allowing the same to fire. This will provide the circuit for the resistors 65, 66 and diode 64 through the transistor 70 to the negative terminal 37 of the rectifier. A capacitor 69 connected between the emitter 68 and the voltage reference point 82 stabilizes the operation of transistor 70 such that it will conduct only when the transistor 75 goes non-conducting. Similarly, a resistor 89 and light emitting diode 90 are series connected across the output conductor 42 of the voltage regulator to the collector 65 of transistor 70 will provide a circuit for the light emitting diode to allow the same to provide an indication that transistor 70 is conducting. This will establish the parallel circuit for the voltage controller, adjusting the voltage level at the adjusting terminal 41 of the voltage regulator to reduce the voltage output level therefrom. This new voltage output is the float voltage which is designed to maintain the battery in a charged condition after it has been charged. The magnitude of the float voltage is established by the variable resistor 66. For example, the float mode voltage to maintain the battery in a charged condition after fast charge is approximately 2.3 volts per cell.

Also, included in the battery charging circuit is a current limiting circuit formed by a transistor 95 whose base 96 is connected to the conductor 48 common to terminal 47 with its collector connected through a bias resistor 98 to voltage adjusting terminal 41 of voltage regulator 40. Its emitter is connected to the current limiting circuit 50 and base 71 of the transistor 75. Whenever current from the battery in the fast charge mode exceeds a predetermined value, the voltage drop across resistor 49 will bias the transistor 95 to conduct. This will add resistor 98 in parallel circuit with resistors 61, 62 to change the bias on the terminal 41 and reduce the voltage output from the voltage regulator so that the current output is reduced to a safe value. Transistor 95 is normally in a non-conducting state and hence, resistor 98 is normally not in the voltage controller circuit. When fired on an over current condition for voltage regulator 40, transistor 95 will remain conducting only so long as current flow through the battery and resistor 49 remains at a level to bias transistor 95 to a conducting state. With a drop in output voltage from the regulator, the fast charge voltage output is reduced and the charging current gradually drops off to a point where the transistor 95 becomes non-conducting. At such a time the charging current is normally at a level where transistor 95 will not become conducting again, unless the over current condition continues. This operation will be repeated until the charging current reaches a safe level after which the transistor 95 will remain non-conducting.

The improved dual mode battery charger senses battery requirements and automatically switches from a fast charge to a float mode of operation or back from a float mode to a fast charge operation depending upon the condition of the battery. In the fast charge mode of operation, the battery charger is capable of recharging batteries in less than 16 hours without danger of overcharge to the battery, gasing or the like. When connected to a discharged battery, the adjustable voltage regulator delivers current to the battery in a fast charge voltage level established by the voltage controller circuit formed by resistors 61 and 62. The level of the fast charge voltage output of the regulator can be adjusted by varying the resistance of the resistor 62. Current flows to the battery at the fixed voltage output. As the battery becomes charged, current through the battery reduces as it reaches its charged state. Current flow through the battery as sensed by the current detector 50 will maintain the bias on the transistor 75 such as to maintain it in a conducting condition and provide an indication from the light emitting diode 80 circuit. When the battery becomes fully charged, the current through the battery reduces to a known value, depending upon battery capacity, and the current detector 50 will provide a lower bias level to the transistor 75. Thus, the voltage drop across resistor 52 will reduce, changing the bias on the base 71 of the transistor and allowing the same to turn off. This will extinguish the light emitting diode 80 and adjust the level of the voltage at the point 82 common to the zener diode 85 such that the bias on the base of the transistor 70 will allow the same to conduct. With conduction of the transistor 70, the parallel resistance circuit, formed of resistors 65, 66, will be connected in parallel with the resistors 61, 62 to adjust the voltage on the adjustment terminal 41 of the voltage regulator. At the same time, the light emitting diode 90 will be energized to provide an indication of a float mode of operation for the battery charger. The battery charger will remain in the float state, delivering a trickle charge to the battery until the battery has become discharged with demand. When this happens, the current detector senses the increase in battery charging current and transistor 75 turns on, thereby altering the voltage at the adjustment terminal 41 of the regulator by causing transistor 70 to turn off and removing the parallel resistance portion of the voltage control circuit. With the voltage level at the adjustment terminal 41 of the voltage regulator at the new level, the voltage output from the battery charger changes to the fast charge value increasing the charging current to the battery. This process repeats itself as often as required. In the event of an overcurrent condition existing in the fast charge mode of operation, the current limiting circuit formed by transistor 95 and resistor 98 will be connected to the voltage adjusting terminal of regulator 40 to reduce current output therefrom until the overcurrent condition is overcome.

The improved battery charger through the voltage regulator, includes temperature compensation and current limiting with visual indication of the charging and float modes of operation. The diodes 58 and 60 provide for short circuit and reverse battery protection. The voltage regulator provides for voltage regulation of the energizing source and the load current up to the normal current output of the voltage regulator.

In consideration this invention, it should be remembered that this disclosure is illustrative only and the scope of the invention should be determined by the appended claims.

What we claim is:

1. An automatic dual mode battery charging circuit comprising, rectifying means adapted to be connected to an alternating current source of power, an adjustable voltage regulator connected to said rectifying means and having an output circuit adapted to be connected to a battery to be charged; a voltage controller connected to the voltage regulating means to set the level of voltage output of the voltage regulating means between two modes of operation, said voltage controller including a pair of parallel selectively connected variable resistance circuits, each of which has a separate adjustable resistor to adjust the current output of the voltage regulator for each of the two modes of operation, each circuit of which is connected to an input of the voltage regulator; and current detector means connected between the rectifying means and the battery and sensing charging current flowing through the battery, said current detector means being connected to the voltage controller to change the operation of the voltage regulating means between the two modes of operation.

2. The automatic dual mode battery charger of claim 1 in which the current detector means includes a switching means operative upon a predetermined current flow through the current detector means to selectively connect said one of said parallel circuits to the voltage controller to the voltage regulator.

3. The automatic dual mode battery charger of claim 2 in which the switching means of the current detector means is a first transistor having a current detecting circuit connected to its base to control the operation of said first transistor and connect said one of said parallel resistance circuits to the voltage controller.

4. The automatic dual mode battery charger of claim 3 in which the current detector means includes a second transistor controlled by the operation of said first transistor to selectively connect said one of said parallel variable resistance circuits to the voltage controller.

5. The automatic dual mode battery charger of claim 4 in which first and second transistors each have an indicating light connected thereto and controllably energized thereby.

6. The automatic dual mode battery charger of claim 5 in which said first and second transistors are connected in parallel circuit across the output terminals of the battery charger with said first transistor circuit being normally on with a high voltage output from the voltage regulator and being biased to an off condition with a drop in battery charging current to turn the second transistor on and connect the variable resistance circuits of the voltage controller in parallel circuit.

7. The automatic dual mode battery charger of claim 6 in which said first transistor has a base connected to said current detector means formed of a resistor and diode in parallel circuit and connected in series circuit with the second terminal of the battery and the rectifier, a zener diode connecting the base of said second transistor to a biasing circuit, said biasing circuit connected to said first transistor such that the bias on said second transistor is changed when said first transistor becomes inoperative to fire the second transistor.

8. The automatic dual mode battery charger of claim 7 and including a current limiting circuit connected between the second terminal of the battery charger and the voltage controller and responsive to an over current condition in the battery charger to adjust the voltage of the voltage controller.

9. The automatic dual mode battery charger of claim 8 in which the current limiting circuit includes a transistor having its base connected to the second terminal of the battery charger and operative to connect a third resistor in parallel circuit with the other of said variable resistance circuits of the voltage controller.

* * * * *